United States Patent

Kubota et al.

[11] Patent Number: 5,955,124
[45] Date of Patent: Sep. 21, 1999

[54] PROCESS FOR PRODUCING A CONDIMENT

[75] Inventors: Kaoru Kubota; Naoko Tsuyoshi; Shigeru Yamanaka; Toshio Kato; Hisao Fukuda, all of Kawasaki, Japan

[73] Assignee: Ajinomoto Co., Inc., Tokyo, Japan

[21] Appl. No.: 08/594,489

[22] Filed: Jan. 31, 1996

[30] Foreign Application Priority Data

Jan. 31, 1995 [JP] Japan .................................. 7-014243

[51] Int. Cl.⁶ ................................ A23B 4/10; A23B 4/20
[52] U.S. Cl. ............................. 426/56; 426/55; 426/641; 426/650
[58] Field of Search .................................. 426/56, 55, 57, 426/58, 59, 645, 646, 641, 650

[56] References Cited

U.S. PATENT DOCUMENTS

| | | | |
|---|---|---|---|
| 2,926,090 | 2/1960 | Williams | 426/56 |
| 3,814,817 | 6/1974 | Everson | 426/56 |
| 4,147,807 | 4/1979 | Gryczka | 426/56 |
| 4,886,673 | 12/1989 | Hammes | 426/56 |

FOREIGN PATENT DOCUMENTS 0 191 513  8/1986  European Pat. Off. .
0 505 733  9/1992  European Pat. Off. .

OTHER PUBLICATIONS

Womans Day Encyclopedia of Cookery vol. 6 1966 Fawcett Publications, Inc New York pp. 849–865.
Frazier 1967 Food Macrobiology McGraw–Hill Book Co. New York pp. 261–264.
Romans & Ziegler 1977 The Meat we Eat The Interstate Printers & Publishers, Danville IL pp. 560–573.
Gerrard 1969 Sausage & Small Good Production Leonard Hill Books London pp. 17, 45–103, 107–145.
Banwart 1981 Basic Food Microbiology AVI Publishing Co. Westport CT pp. 286–287, 293, 294.

*Primary Examiner*—Carolyn Paden
*Attorney, Agent, or Firm*—Oblon, Spivak, McClelland, Maier & Neustadt, P.C.

[57] ABSTRACT

The present invention provides a method for producing a condiment with decreased animal smell and which has increased beefwise taste and greater body flavor and complex flavor. The condiment is produced by blending therein denatured meat and/or the extract thereof, wherein the denatured meat is obtained by salting livestock meat, washing and then allowing microorganisms to ferment and ripen the meat.

19 Claims, No Drawings

PROCESS FOR PRODUCING A CONDIMENT

BACKGROUND OF THE INVENTION

1. Field of the Invention

The present invention relates to a process for producing a condiment by mixing with a base condiment denatured meat and/or the extract thereof, wherein the denatured meat is obtained by causing microorganisms to act on livestock meat to ferment and ripen it after salting it.

2. Discussion of the Background

Extracts of livestock meats and bones thereof have previously been used for various condiments or bases thereof and have wide application. However, these extracts are limited both in complexity of flavor and strength. Moreover, extracts obtained from chickens and pigs generally have unpleasant odors. Beef extract has been used in the past for many condiments, but an extract of good quality cannot be easily obtained and is expensive. Thus, other extracts including vegetable extracts, components such as monosodium glutamate (MSG) and inosine monophosphate (IMP), sugars, and many other condiments and spices are usually added and used.

Conventionally, fermented meat has been prepared using microorganisms which act abiogenetically on meat. Such fermented meats include Iberian ham in Spain, Palma ham, San Daniel ham in Italy, Chinese ham in China, and country ham in the U.S. Microorganisms separated from these fermented meats include filamentous fungi (Aspergillus spp, Penicillium spp, *Cladosporium herbarum*, and *Alternaria tenuis*), lactic acid bacteria, and yeast (Huerta et al., *Microbiologie*, 5, 247 (1987); Franco et al., *Industie allimentari*, settembre, 676 (1984); and Morina et al., *Fleischwirtsch*, 70 (1), 115 (1990)). These microorganisms can be added as a starter in preparing fermented meat (Campbell-Paltt, G. Cook, P. E.: *Fermented Meats*, 134, (1995)). However, the relationship between the action of these microorganisms on meat with taste is complicated, and has not previously been clarified.

In view of the aforementioned deficiencies attendant with the prior art methods of preparing food extracts, it is clear that there exists a need in the art for an improved processing method and blend ratio, based on raw materials of good quality, for producing such extracts which will provide condiments having a diversity of tastes.

SUMMARY OF THE INVENTION

Accordingly, one object of this invention is to provide a novel method for producing a condiment or fermented meat extract, which includes the steps of blending meat obtained by salting livestock meat, and causing microorganisms to act on the meat to ferment and ripen it.

Another object of the present invention is to remove animal smell from meat, particularly from livestock meat, and to develop and increase beefwise taste in order to further improve conventional condiments, to expand the varieties of a condiment, and to develop a simple blending method for a condiment which has increased taste, body flavor, and complex flavor.

The present invention takes advantage of the discovery that fermented meat and/or the extract thereof have a peculiar flavor and that they can be included in many dishes. In this connection, it has been discovered by the present inventors that certain substances added in proper quantity to basic condiments or commercially available condiments, and consomme base, decrease the animal smell therein more than those condiments prepared by adding the substances independently. Moreover, the taste, body flavor, and complex flavor are increased, and beefwise taste is developed or increased.

DESCRIPTION OF THE PREFERRED EMBODIMENTS

The present invention relates to a process for producing a condiment, in which denatured meat obtained by salting livestock meat is processed with microorganisms selected from filamentous fungi and/or yeast, to ferment and ripen the meat and/or the extract thereof, and the fermented meat or extract thereof is added to a base condiment, whereby the condiment is provided with beefwise taste and has a fragrance and taste which are different from those of the raw material.

The term "condiment" is well known in the art and refers to, for example, monosodium glutamate, ribonuceotides, organic acids such as succinic acid, extracts of livestock meats and bones and mixture thereof (soup base) and includes such items as consomme base, chicken broth and pork broth.

The denatured meat of the present invention is produced by a series of steps wherein livestock meat is salted and microorganisms are grown thereon.

A raw material used for the denatured meat of the present invention is livestock meat. In particular, the meat includes but is not limited to beef, pork, horsemeat, mutton, and chicken. The part or cut of the meat is not specifically restricted. However, preferably dark meat is used.

The microorganisms which are used to ferment the meat to produce the denatured meat of the present invention include but are not limited to the microorganisms of Penicillium, Eurotium, Aspergillus, Paecilomyces and include, for example, *Penicillium roquefortii, Penicillium granulatum, Penicillium myczinskii, Penicillium expansam, Penicillium cyaneo-fulvun, Eurotium chevalieri, Eurotium repens, Aspergillus oryzae, Aspergillus soyae, Aspergillus glaucus, Aspergillus ussami*, and *Paecilomyces fumosoroseus*. In other preferred embodiments the microorganisms include species of Monascus, Pichia, and Debaryomyces and include, for example, *Monascus anka, Pichia anomala*, and *Debaryomyces hanzenii*. These microorganisms may be used singly or in a mixture of two or more kinds.

The representative strains of the microorganisms belonging to these respective genera are deposited and preserved in domestic and overseas public microorganism deposition organizations and can be used for carrying out the present invention by purchasing them from these institutions. The domestic and overseas representative public microorganism deposition organizations preserving the strains of the microorganisms used in the present invention include, for example, Centraalbureau voor Schimmelculturers, Baarn, Netherlands, organization code: CBS; Fermentation Institute Foundation, Osaka, organization code: IFO; and the Institute of Physical and Chemical Research, microorganism system preserving facility, Wako, Saitama prefecture, organization code: JCM.

Furthermore, these organisms can be isolated from foods containing the microorganisms belonging to these respective genera using conventional methods. In particular, the microorganisms may be separated from, for example, Chinese cheese, dried bonito, cheese, salami sausage, and raw ham.

One general process for producing denatured meat according to the invention is as described below. First, meat is cut to an appropriate size if necessary. In this case, skin, hair and dirt are chipped off, unnecessary fat is removed, and blood is squeezed. Salting may be carried out by a wet salting method in which a meat block is salted in pickle, and/or a dry salting method in which a salting agent is rubbed in a meat block. Salt, nitrate, and nitrite, among others, can be used as the salting agent. Also, according to necessity, the salting agents usually used for ham and sausage may be used in combination with substances such as sucrose, glucose, ascorbic acid, lactic acid, phosphates, sorbic acid, and spice. The amount of the salt can be used in a proportion of 1 to 30%, preferably 5 to 20% of the meat. The period and frequency of the salting can be adjusted suitably as desired. The meat is then washed well with water and dried. Thereafter, the dried meat is exposed to microorganisms such as those described above. Suitable exposure techniques include coating the meat with the cultivation liquid of microorganisms, dipping the meat in the cultivation liquid, or particularly in case of filamentous fungi, spraying or coating the meat with the spores or conidiospores which are in the form of a suspension. The fermentation period can be 7 days to 3 years, and the temperature can be −2 to 40° C., preferably one month to one year and 5 to 20° C. Because the meats are natural articles, even where the same strains are acted on under the same conditions, the resulting denatured meats may vary. Thus, special attention should be paid to environmental management such that the nature of the denatured meats produced from different kinds and lots of meat may be controlled.

The water content of the resulting denatured meat is reduced by the microorganisms as protein and fat in the meat are decomposed by the enzymatic action of the microorganisms. Further, the denatured meat comes to have a peculiar fragrance component. In addition, peculiar taste, body flavor and acidic flavor result. Since the generation of antioxidant substances increases the preservability, both the appearance and the quality are improved. Likewise, the smell peculiar to the meat disappears, and inversely, a characteristic taste is provided which is associated with the improved fragrance peculiar to this ripened meat.

This denatured meat and/or the heat-extracted extract are added to base condiments, sauces, and soup bases as solids, or in the forms of liquid, powder and solid powders. The amount thereof to be added is suitably determined according to necessity. Usually, 5 to 60 weight %, preferably 25 to 40 weight % in terms of the solid matter of a denatured meat extract in the condiment is suitable for the development of a synergistic effect.

Having generally described this invention, a further understanding can be obtained by reference to certain specific examples which are provided herein for purposes of illustration only and are not intended to be limiting unless otherwise specified.

EXAMPLES

Example 1

A mixture of 150 g salt, 0.1 g sodium nitrite and 1.9 g sodium nitrate was rubbed sufficiently on the surface of the ham of a pig of 1 kg, and the ham was ripened at 2° C. for 30 days. The meat was washed with running water and dried at 10° C. and a relative humidity of 75% for 3 days until the moisture activity in the meat reached 0.95.

A spore suspension ($2.0 \times 10^5$/ml) of *Penicillium expansum* IFO 5453 was sprayed on the surface thereof, and the sprayed meat was ripened at 15° C. for 6 months, whereby a denatured meat of about 640 g was obtained (denatured meat 1).

Example 2

A denatured meat was obtained in the same manner as in Example 1, except that *Eurotium repens* IFO 4885 was substituted for *Penicillium expansum* IFO 5453 (denatured meat 2).

Example 3

A denatured meat was obtained in the same manner as in Example 1, except that a mixture of spore suspensions of *Penicillium expansum* IFO 5453 and *Eurotium repens* IFO 4885 (each $2.0 \times 10^5$/ml), *Aspergillus oryzae* IFO 30104, *Monascus anka* IFO 4478 and *Paecillomyces fumosoroseus* IFO 7072 (each $2.0 \times 10^5$/ml), and *Debaryomyces hanzenii* IFO 17 and *Pichia anomala* IFO 130 (each $1.0 \times 10^5$/ml) were used (denatured meat 3).

Preparation of Denatured Meat Extract

Water of 5 weight parts per one weight part of the denatured meat was added to the above denatured meats 1, 2 and 3, respectively, and after heating them at 100° C. for one hour, solid matters were removed by filtering, and further, oil matters were separated, whereby a denatured meat extract (a pure extract whose solid content accounted for about 10% of the weight of the denatured meat) was obtained (denatured meat extracts 1, 2 and 3).

Condiment Preparation

Denatured meat 3 was used to prepare condiments (soup) having the compositions shown in Table 1, and a sensory evaluation was carried out.

TABLE 1

Composition of condiment (soup base)

| | Reference 1 | Sample A | (Unit: g) Sample B |
|---|---|---|---|
| NaCl | 4.0 | 4.0 | 4.0 |
| Sugar | 1.5 | 1.5 | 1.5 |
| MSG | 1.2 | 1.2 | 1.2 |
| Soybean oil | 1.0 | 1.0 | 1.0 |
| IMP | 0.015 | 0.015 | 0.015 |
| Denatured meat | — | 25 | 50 |
| Ham | 25 | — | — |
| Water | 500 | 500 | 500 |

The salt amount from the denatured meat was corrected to make the final salt concentration of the condiment the same as that of Reference 1.

500 ml water was added to the blended products described above, and the mixtures were heated. When they boiled, they were poured into sampling cups to carry out the sensory evaluation.

The sensory evaluation was carried out with ten panels. The evaluation items are shown in Table 2. The scores were counted by a 5 grade evaluation of −1 (weak) to +2 (strong) with zero points allocated to reference 1 for all items excluding the total evaluation, and by an 11 grade evaluation of 0 to 10 points with 5 points allocated to reference 1 in for the total evaluation.

TABLE 2

Sensory evaluation of soup

| | Reference 1 | Sample A | Sample B |
|---|---|---|---|
| Strength of fragrance | 0 | 0.8 | 1.2 |
| Strength of animal smell | 0 | −1.0 | −0.1 |

TABLE 2-continued

Sensory evaluation of soup

|  | Reference 1 | Sample A | Sample B |
|---|---|---|---|
| Strength of pork flavor | 0 | -0.4 | 0.3 |
| Strength of beef flavor | 0 | 1.1 | 1.5 |
| Strength of taste | 0 | 0.6 | 1.0 |
| Strength of body flavor | 0 | 0.7 | 1.1 |
| Strength of complex flavor | 0 | 0.7 | 1.3 |
| Total evaluation | 5 | 7.4 | 5.5 |

The results of the sensory evaluation show that the soup (sample A) using the denatured meat had increased beefwise taste, body flavor, and complex flavor using ham and decreased animal smell of the ham as compared with those of the soup represented by reference 1, and thus the beneficial effects of the denatured meat according to the present invention were observed. However, in sample B, in which the amount of denatured meat added was increased, it was observed that the fragrance and flavor of the denatured meat tended to be too strong.

Denatured meat extracts from denatured meat 3 were used to prepare the Sample C and D soups shown in Table 3, and after heating and boiling them, the soups were subjected to the sensory evaluation. The product (brand name: Chicken Consomme) manufactured by Knorr Co., Ltd. was used for the consomme cube.

TABLE 3

Composition of soup

|  | Reference 2 | Sample C | Sample D |
|---|---|---|---|
| Consomme cube | 1 piece | 1 piece | 1/2 piece |
| Denatured meat extract | — | 100 ml | 100 ml |
| Water | 300 ml | 200 ml | 300 ml |

The sensory evaluation was carried out using the same panels in the same manner as those used in Table 2. The results thereof are shown in Table 4.

TABLE 4

Sensory evaluation of soup

|  | Reference 2 | Sample C | Sample D |
|---|---|---|---|
| Strength of fragrance | 0 | 0.8 | 0.8 |
| Strength of beef flavor | 0 | 1.1 | 0.7 |
| Strength of taste | 0 | 1.6 | 0.5 |
| Strength of body flavor | 0 | 1.3 | 0.8 |
| Strength of complex flavor | 0 | 1.0 | 0.8 |
| Total evaluation | 5 | 5.9 | 7.8 |

The results of the sensory evaluation show that both sample C and sample D to which the denatured meat extract was added increased in body flavor and complex flavor as compared with those of reference 2 and increased as well in beef taste even though pork was used as the raw material, and the effects of the denatured meat according to the present invention were thus observed.

Next, samples E and F were prepared with denatured meats 1 and 2 in the same composition as that of the sample A in Table 1, and samples G and H with the denatured meat extracts 1 and 2 in the same composition as that of sample D in Table 3, and they were subjected to the sensory evaluation (Tables 5 and 6).

TABLE 5

Sensory evaluation of soup

|  | Reference 1 | Sample E | Sample F |
|---|---|---|---|
| Strength of fragrance | 0 | 0.5 | 1.0 |
| Strength of animal smell | 0 | -0.8 | -1.1 |
| Strength of pork flavor | 0 | 0.1 | -.6 |
| Strength of beef flavor | 0 | 0.1 | 1.3 |
| Strength of taste | 0 | 0.8 | 0.1 |
| Strength of body flavor | 0 | 0.8 | 0.1 |
| Strength of complex flavor | 0 | 0.7 | 0.3 |
| Total evaluation | 5 | 5.4 | 6.5 |

The results of the sensory evaluation show that sample E to which the denatured meat 1 was added increased in body flavor and complex flavor as compared with that of reference 2, and sample F, to which the denatured meat 2 was added, increased in beefwise taste, and thus the beneficial effects of the denatured meat according to the present invention were observed. Sample A was high in terms of the total evaluation as compared with the samples E and F.

TABLE 6

Sensory evaluation of soup

|  | Reference 2 | Sample G | Sample H |
|---|---|---|---|
| Strength of fragrance | 0 | 0.6 | 1.1 |
| Strength of beef flavor | 0 | 0.1 | 0.8 |
| Strength of taste | 0 | 0.7 | 0.2 |
| Strength of body flavor | 0 | 0.8 | 0.3 |
| Strength of complex flavor | 0 | 0.8 | 0.3 |
| Total evaluation | 5 | 5.5 | 6.7 |

The results of the sensory evaluation show that sample G, to which the denatured meat 1 was added, increased in body flavor and complex flavor as compared with those of reference 2, and sample H to which denatured meat 2 was added increased in beefwise taste, and thus the beneficial effects of the denatured meat according to the present invention were observed. Sample D was high in terms of the total evaluation as compared with the samples G and H.

As explained above, a condiment which has no animal smell and which has increased body flavor and increased beefwise flavor can be produced according to the present invention by mixing with conventional condiments or soup bases denatured meat (or its extract) obtained by causing microorganisms to act on livestock meat to ferment and ripen it after salting, washing and drying.

This application is based on JP 014243/1995, filed Jan. 31, 1995, which is hereby incorporated by reference in its entirety.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for producing a condiment, comprising, preparing denatured meat by salting livestock meat, subsequently washing the meat and then fermenting and ripening said meat after washing by inoculation with a microorganism, wherein said microorganism is at least one of (1) a filamentous fungus belonging to a Penicillium genus, an Eurotium genus, an Aspergillus genus, a Monascus genus, or a Paecilomyces genus, (2) yeasts belonging to a Pichia genus or a Debaryomyces genus or (3) mixtures thereof to produce a denatured meat, and subsequently mixing said denatured meat, an extract of the denatured meat, or a mixture thereof with a base condiment.

2. A process for producing a condiment as described in claim 1, wherein said denatured meat or said extract thereof is 5 to 60 weight % of the solid matter of the denatured meat in the condiment.

3. A process for producing a condiment as described in claim 2, wherein said denatured meat or said extract or mixture thereof is 25 to 40 weight % of the solid matter of the denatured meat in the condiment.

4. A process for producing a condiment as described in claim 1, wherein the livestock meat is beef, pork, horsemeat, mutton or chicken.

5. A process for producing a condiment as described in claim 4, wherein the livestock meat is dark meat.

6. A process for producing a condiment as described in claim 1, wherein the salt is sodium chloride, nitrate or nitrite.

7. A process for producing a condiment as described in claim 6, wherein the salt is mixed with sucrose, glucose, ascorbic acid, lactic acid, phosphate, spice, or a mixture thereof.

8. A process for producing a condiment as described in claim 1, wherein the proportion of salt added is 1–30% of the weight of the livestock meat.

9. A process for producing a condiment as described in claim 8, wherein the proportion of salt added is 5–20% of the weight of the livestock meat.

10. A process for producing a condiment as described in claim 1, wherein the salted, washed livestock meat is inoculated by coating with cultivation liquid containing the microorganism.

11. A process for producing a condiment as described in claim 1, wherein the salted, washed livestock meat is inoculated by dipping in cultivation liquid containing the microorganism.

12. A process for producing a condiment as described in claim 1, wherein the salted, washed livestock meat is inoculated by spraying with a suspension containing the microorganism.

13. A process for producing a condiment as described in claim 1, wherein the fermentation is conducted for 7 days to 3 years.

14. A process for producing a condiment as described in claim 1, wherein the fermentation is conducted at a temperature of −2 to 40° C.

15. A condiment prepared by the process of claim 1.

16. A process for producing a condiment as described in claim 1, wherein an extract of the denatured meat is mixed with the base condiment.

17. A condiment prepared by the process of claim 16.

18. A process for producing a condiment as described in claim 1, wherein a mixture of the denatured meat and an extract of the denatured meat are mixed with the base condiment.

19. A condiment prepared by the process of claim 18.

* * * * *